US012770377B2

(12) United States Patent
Pototzky

(10) Patent No.: US 12,770,377 B2
(45) Date of Patent: Oct. 20, 2026

(54) FASTER CONVERGING PRE-TRAINING FOR MACHINE LEARNING MODELS

(71) Applicant: Robert Bosch GmbH, Stuttgart (DE)

(72) Inventor: Daniel Pototzky, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 18/850,095

(22) PCT Filed: May 3, 2023

(86) PCT No.: PCT/EP2023/061645

§ 371 (c)(1),
(2) Date: Sep. 24, 2024

(87) PCT Pub. No.: WO2023/213867

PCT Pub. Date: Nov. 9, 2023

(65) Prior Publication Data

US 2025/0259421 A1 Aug. 14, 2025

(30) Foreign Application Priority Data

May 6, 2022 (DE) ..................... 10 2022 204 492.4

(51) Int. Cl.
*G06V 10/72* (2022.01)
*G06V 10/764* (2022.01)
(Continued)

(52) U.S. Cl.
CPC ............ *G06V 10/774* (2022.01); *G06V 10/72* (2022.01); *G06V 10/764* (2022.01);
(Continued)

(58) Field of Classification Search
CPC .... G06V 10/774; G06V 10/72; G06V 10/764; G06V 10/7715; G06V 10/776;
(Continued)

(56) References Cited

U.S. PATENT DOCUMENTS

| | | | | |
|---|---|---|---|---|
| 12,166,952 | B2 * | 12/2024 | Redden | G06F 18/2415 |
| 2023/0072747 | A1 * | 3/2023 | Pototzky | G06N 3/084 |

OTHER PUBLICATIONS

Guo, Xiaoyang & Zhao, Tianhao & Lin, Yutian & Du, Bo. (2021). MixSiam: a Mixture-based Approach to Self-supervised Representation Learning. 10.48550/arXiv.2111.02679. (Year: 2021).*

(Continued)

*Primary Examiner* — Mia M Thomas
(74) *Attorney, Agent, or Firm* — Norton Rose Fulbright US LLP

(57) ABSTRACT

A method for unsupervised pre-training of a machine learning model. A set of training examples for inputs of the machine learning model is provided. A region of the machine learning model to be pre-trained is specified. Variations from each training example are generated. Each variation is processed into a first output in a first processing branch, which includes at least one first instance of the region to be pre-trained. Each variation is processed into a second output in a second processing branch which includes at least one second instance of the region to be pre-trained. For each variation, the similarity of the first output generated from this variation to an aggregation of the second outputs generated from all the other variations of the same training example is ascertained. Parameters that characterize behavior of the first instance of the region to be pre-trained are optimized.

14 Claims, 2 Drawing Sheets

(51) Int. Cl.
*G06V 10/77* (2022.01)
*G06V 10/774* (2022.01)
*G06V 10/776* (2022.01)
*G06V 20/58* (2022.01)

(52) U.S. Cl.
CPC ........ *G06V 10/7715* (2022.01); *G06V 10/776* (2022.01); *G06V 20/58* (2022.01)

(58) Field of Classification Search
CPC .......... G06V 20/58; G06N 3/04; G06N 3/088; G06N 3/09; G06N 3/096
See application file for complete search history.

(56) References Cited

OTHER PUBLICATIONS

International Search Report for PCT/EP2023/061645, Issued Aug. 2, 2023.
Chen et al., "Exploring Simple Siamese Representation Learning," Cornell University, 2020, pp. 1-10.
Choi et al., "Learning Descriptor, Confidence, and Depth Estimation in Multiview Stereo," 2018 IEEE/CVF Conference on Computer Vision and Pattern Recognition Workshops (CVPRW), IEEE, 2018, pp. 389-395.
Fu et al., "CompFeat: Comprehensive Feature Aggregation for Video Instance Segmentation," The Thirty-Fifth AAAI Conference on Artificial Intelligence (AAAI-21), 2020, pp. 1-9.
Guo et al., "MixSlam: a Mixture-based Approach to Self-supervised Representation Learning," Cornell University, 2021, pp. 1-9.

* cited by examiner

FASTER CONVERGING PRE-TRAINING FOR MACHINE LEARNING MODELS

FIELD

The present invention relates to the unsupervised pre-training of machine learning models, which can then be further trained, for example in a supervised manner, for a given task.

BACKGROUND INFORMATION

Training a machine learning model on a particular task, starting from an empty or randomly initialized starting state, requires a large number of training examples and a lot of computing time. A significant portion of this effort can be saved by using a generically pre-trained machine learning model and then further training it specifically for the desired task. Often, the same generically pre-trained model can be used as a starting point for the training for many tasks. For example, an image classifier can be generically pre-trained to recognize particular basic features in the images. In the specific training, the image classifier can then, for example, learn to recognize particular objects by using these basic features.

Generic pre-training promises a large cost advantage, especially if this pre-training takes place in an unsupervised manner, i.e., on the basis of training examples that are not labeled with target outputs. Labeling training examples is very expensive since it typically requires manual work.

SUMMARY

The present invention provides a method for unsupervised pre-training of a machine learning model.

A machine learning model in particular refers to a model that embodies a function that is parameterized with adjustable parameters and has great power to generalize. When training a machine learning model, the parameters can in particular be adjusted in such a way that, when training examples are entered into the machine learning model, the associated target outputs are reproduced as well as possible. The machine learning may in particular include an artificial neural network (ANN) and/or be an ANN.

According to an example embodiment of the present invention, within the framework of the method, a set of training examples is provided for inputs of the machine learning model. These training examples do not need to be labeled with target outputs.

A region of the machine learning model that is to be pre-trained is also specified. This region may in particular be selected such that it can be used in the pre-trained state for multiple different tasks. For example, many classifiers comprise a region that analyzes the input of the machine learning model for features and a task head that uses the result of this analysis to ascertain classification scores with respect to one or more classes of a given classification. The task head is then specific to the specific classification task, while the analyzed features can also be used for other tasks. It then makes sense not to include the task head in the pre-training.

Thus, a region of the machine learning model that is designed to extract features from the input of the machine learning model is advantageously selected as a region to be pre-trained. In this context, it is once again advantageous that the training examples do not have to be labeled, because the available labels generally relate to the final output of the machine learning model with respect to the given task.

However, no labels are available for intermediate results, such as feature maps of a feature extractor. It is also not possible, for example, to infer target outputs regarding the feature maps from target outputs regarding classification scores to be provided by the machine learning model, because the task head maps many different feature maps, which were generated, for example, for different images of one and the same object from different perspectives, to one and the same vector of classification scores, i.e., for example, a "one-hot vector" with a score of 1 for the class of the object.

Variations are generated from each training example. Any data augmentation method can be used for this purpose.

Each variation is processed into a first output in a first processing branch, which comprises at least one first instance of the region to be pre-trained. However, each variation is also processed into a second output in a second processing branch, which comprises at least one second instance of the region to be pre-trained. In this context, the term "instances" is in particular to be understood to mean that the processing in both instances takes place independently of one another. In particular, it should not affect the processing in the second instance if parameters (for example, weights) of the first instance are changed.

For each variation, the similarity of the first output generated from this variation to an aggregation of the second outputs generated from all other variations of the same training example is ascertained. Parameters that characterize the behavior of the first instance of the region to be pre-trained are optimized with the goal of maximizing the similarity thus ascertained. The thus obtained parameters are specified as pre-trained parameters of the machine learning model.

It was found that especially aggregating the second outputs generated from the respective other variations of the same training example makes the pre-training significantly more stable. These second outputs provide, in a sense, the goal at which the optimization in the first instance of the region to be pre-trained is aimed. When individual comparisons are made between first outputs and second outputs, the second output and thus the goal changes with each new variation of the training example. However, training in which the goal constantly changes takes significantly longer and also requires significantly more resources, for example multiple GPUs, the cooperation of which must also be synchronized. This is somewhat analogous to the scenario where, when constructing a building, it is detrimental for adhering to the schedule and budget if the client puts forward new requests for changes to the planning every day while the work is already underway. However, if a plan is consistently followed, it can work.

According to the related art, which was based on individual comparisons, large batches of training examples were needed and training had to take place over many epochs until the pre-training converged to a stable result. This caused a certain averaging effect over the different optimization goals that respectively resulted from the different variations. However, it is much faster and also much easier to accomplish to incorporate the aggregation effect into the specification of the optimization goal and then to consistently pursue this one optimization goal.

This is also evident when analyzing the statistics. For example, let $T_1$ be a second output generated from a particular variation of a training example. If the variations are generated randomly, it can be assumed that $T_1$ is a sample from a normal distribution with a mean value p and a standard deviation σ:

$$T_1 \sim N(\mu, \sigma^2 I),$$

where I is the identity matrix. However, this sample as such can still deviate significantly from what would most often be expected in the normal distribution. However, if K samples are taken and averaged, the variance $\sigma^2$ is reduced by the factor K. The effect is the same as if a single sample $\overline{T_K}$ were taken from a distribution with the reduced variance:

$$\overline{T_K} \sim N\left(\mu, \frac{\sigma^2 I}{K}\right).$$

Even if the simplifying assumption that the distribution is a normal Gaussian distribution is not valid, $\overline{T_K} \rightarrow \mu$ is still true for $K \rightarrow \infty$ as long as the samples are independently and identically distributed.

For generating variations of a training example, any data augmentation method the result of which can still be unambiguously traced back to exactly this training example is suitable. For example, a proper subset of the data of the training example can be randomly selected, such as an image section from a training image, a subarea of a point cloud, or a temporal section from a time series. It is also possible, for example, to impress noise sampled from a random distribution on the data of the training example. Even with this noise, the original training example can still be recognized. The same applies if a particular portion of the data of the training example is removed or made unrecognizable in whole or in part, such as by blurring or blacking out a subregion in an image. As an alternative to or in combination with the options mentioned so far, any other transformation that does not change the semantic content of the data can be applied to the data of the training example.

According to an example embodiment of the present invention, in particular, the aggregation may, for example, comprise ascertaining a mean value, a medoid, or an element-wise maximum. Other aggregations are also suitable insofar as they smooth out differences between the second outputs and, in particular, suppress the influence of outliers.

According to an example embodiment of the present invention, the similarity can, for example, in particular be ascertained by means of a distance measure. For example, if the region of the machine learning model that is to be pre-trained extracts features from the input of the machine learning model, such a distance measure is particularly easy to interpret in the space of the ascertained features. For example, a cosine distance can in particular be chosen as a distance measure.

Starting from a first output $p_{K+1}$ for a training example and K variations $z_1, \ldots, z_K$, a cost function (loss function)

$$L(z_1, \ldots, z_K, p_{K+1}) = -\frac{p_{K+1}}{\|p_{K+1}\|_2} \cdot \frac{\frac{1}{K}\sum_{i=1}^{K} z_i}{\left\|\frac{1}{K}\sum_{i=1}^{K} z_i\right\|_2} = -\frac{p_{K+1}}{\|p_{K+1}\|_2} \cdot \frac{\overline{T_K}}{\|\overline{T_K}\|_2}$$

can thus, for example, be used for the pre-training, where $\overline{T_K}$ is a sample from a normal distribution of which the variance has been reduced by the factor K through aggregation. If each variation is processed once into the first output and the respective other variations specify the optimization goal, the overall result is the cost function $$\mathcal{L}_{total} = \sum_{i=1}^{K+1} \frac{1}{K+1} \mathcal{L}(\{z_j \mid j \neq i \wedge 1 \leq j \leq K+1\}, p_i)$$

for the pre-training.

The training examples may, for example, in particular comprise images or point clouds that were recorded by measurement observation of a scene. Images can be still images or moving images, which were, for example, recorded with one or more cameras for visible light or other parts of the electromagnetic spectrum (such as infrared). Point clouds can be recorded by means of radar sensors or lidar sensors, for example. Especially these data types have a particularly high dimensionality, so that the stability of the training goal that was gained by aggregating the second outputs is particularly important.

The scene can, for example, in particular be a traffic situation that can be observed from a vehicle. It is particularly complex to obtain labeled training examples for traffic situations. Pre-training on unlabeled data is therefore particularly advantageous. Furthermore, especially if evaluating traffic situations, for example for the purposes of at least partially automated driving, there are a large number of tasks that can all utilize the pre-training.

The ultimate goal of the pre-training is to create a better basis for training the machine learning model on a specific given task. After the pre-training, it is therefore advantageous to provide further training examples for inputs of the machine learning model. These further training examples are labeled with target outputs with respect to a given task. They are processed into outputs by the machine learning model. Any deviation of these outputs from the target outputs is assessed by means of a given cost function. Parameters that characterize the behavior of the machine learning model are optimized with the goal that the assessment by the cost function is expected to improve during the further processing of labeled training examples.

In this context, the pre-training described above has the effect that the further training with regard to the specific task requires fewer labeled training examples and also converges faster. As a result, the total training effort, which includes the unsupervised generic pre-training and the supervised task-specific training, can be significantly reduced. Taking into account that the same generic pre-training can form the basis for many task-specific training processes, the savings become even greater.

The machine learning model can, for example, in particular be designed to ascertain a classification of the images or point clouds, which can, for example, in particular depend on the pixel values and/or values of measured variables in these images or point clouds. The classification can, for example, in particular also comprise a semantic segmentation as a region-wise or pixel-wise classification, or a detection of whether an object is present or not. As explained above, a machine learning model for such a task consists largely of regions that extract features from the inputs. Only a small part of the model is apportioned to the task head, which is specific to the specific classification task or segmentation task. A large part of the machine learning model can thus be pre-trained in an unsupervised manner, and the portion of the training that still has to be completed with labeled training examples becomes smaller.

During further training with the labeled training examples, the already pre-trained parameters can be further optimized. With regard to the pre-training, it is not asserted that feature extraction can, for example, lead to an optimum that is also an optimum with respect to every possible downstream task. In fact, different features may also become particularly relevant with respect to different tasks, and the ultimately achieved task accuracy can be improved by focusing the feature extraction precisely on these features, possibly at the expense of other features. This can, for example, be illustrated on the basis of the example of image processing: The contrast of particular desired features can possibly only be increased at the cost of bringing other, less important features into saturation.

However, in a further advantageous example embodiment of the present invention, it may again be advantageous to retain the pre-trained parameters during the training with the further, labeled training examples. This can be useful, for example, if the pre-trained region of the machine learning model has been officially certified in precisely this state. Such certifications may, for example, be required when using machine learning models to control vehicles or other safety-relevant systems.

In a further advantageous example embodiment of the present invention, the further, labeled training examples belong to a different distribution or domain than the training examples used for the pre-training. The method then makes use of the fact that the pre-training on one distribution or domain generalizes well to other distributions or domains.

The use of the terms "distribution" and "domain" is not to be understood as a restriction to the effect that a distribution or domain must be specified, from which the training examples are then sampled. In fact, a given set of training examples may also define a distribution or domain. For example, if all or almost all of the training samples are consistent with a normal distribution with a particular mean value and a particular standard deviation, or with a different random distribution of a specific type with specific parameters, the set of training samples defines this random distribution by allowing inference about its type and parameters. Different domains can, for example, in particular represent different circumstances under which measurement data were, for example, obtained as training examples, such as different seasons, times of day, weather conditions, or imaging modalities with which images were recorded as training examples.

The method according to the present invention can in particular be wholly or partially computer-implemented. For this reason, the present invention also relates to a computer program comprising machine-readable instructions which, when executed on one or more computers, cause said computer(s) to carry out the method described above. In this sense, control devices for vehicles and embedded systems for technical devices, which are also capable of executing machine-readable instructions, are also to be regarded as computers.

The present invention also relates to a machine-readable data carrier and/or to a download product comprising the computer program of the present invention. A download product is a digital product that can be transmitted via a data network, i.e., can be downloaded by a user of the data network, and can, for example, be offered for immediate download in an online shop.

Furthermore, a computer can be equipped with the computer program of the present invention, with the machine-readable data carrier, or with the download product.

Further measures improving the present invention are explained in more detail below, together with the description of the preferred exemplary embodiments of the present invention, with reference to figures.

DETAILED DESCRIPTION OF EXAMPLE EMBODIMENTS

Figure 1:
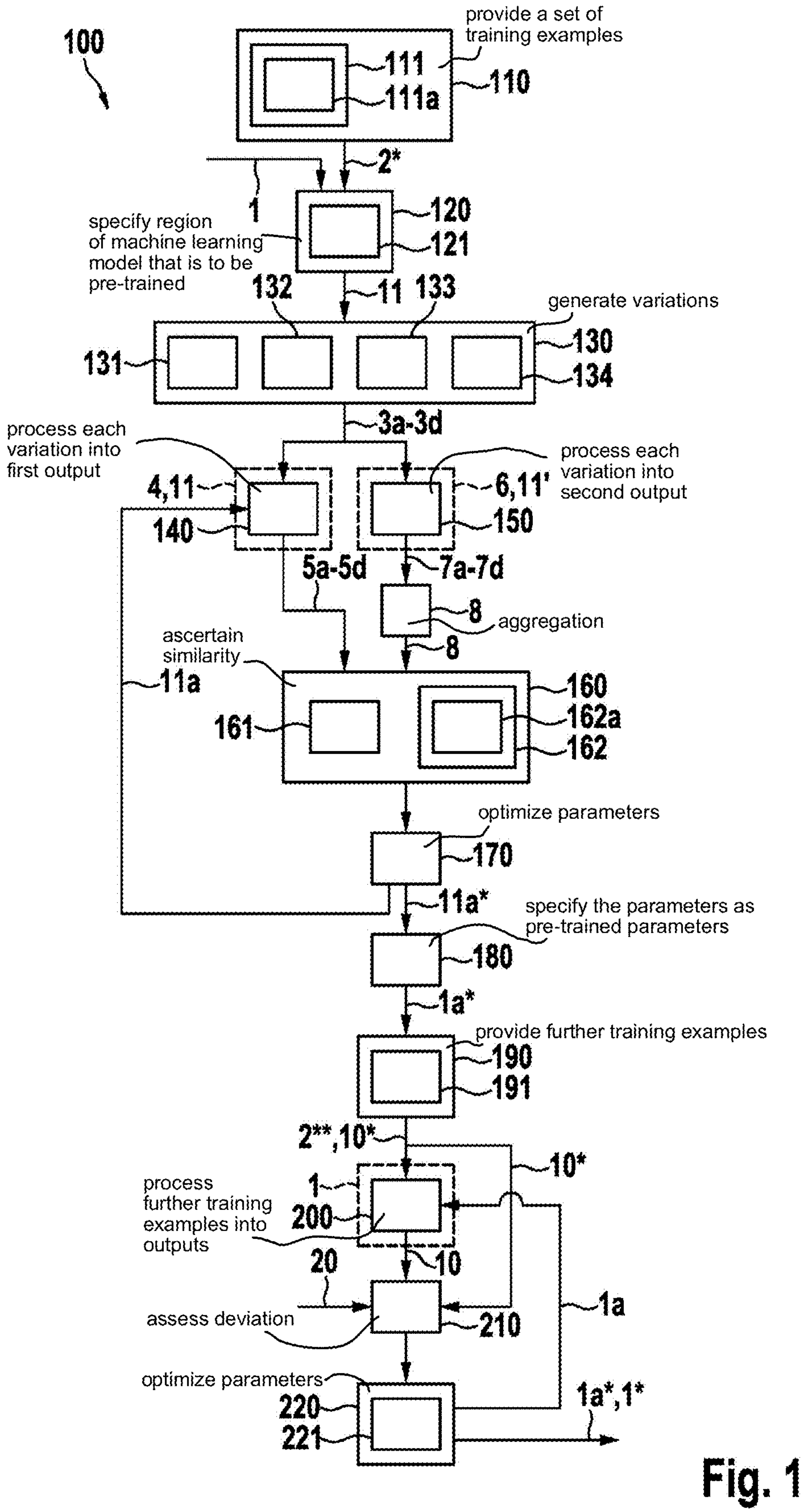
FIG. 1 shows an exemplary embodiment of the method 100 for unsupervised pre-training of a machine learning model 1, according to the present invention.

FIG. 1 is a schematic flow chart of an exemplary embodiment of the method 100 for unsupervised pre-training of a machine learning model 1.

In step 110, a set of training examples 2* are provided for inputs 2 of the machine learning model 1.

According to block 111, images or point clouds recorded by measurement observation of a scene can be selected as training examples 2*. According to block **111*a***, a traffic situation that can be observed from a vehicle can be selected as a scene.

In step 120, a region 11 of the machine learning model 1 that is to be pre-trained is specified.

According to block 121, a region of the machine learning model 1 that is designed to extract features from the input 2 of the machine learning model 1 can be selected as a region 11 to be pre-trained.

In step 130, variations **3*a*-3*d*** are generated from each training example.

According to block 131, a proper subset of the data of the training example 2* can be randomly selected.

According to block 132, noise sampled from a random distribution can be impressed on the data of the training example 2*.

According to block 133, a portion of the data of the training example 2* can be removed or made unrecognizable in whole or in part.

According to block 134, a transformation, that does not change the semantic content of the data, can be applied to the data of the training example 2*.

In step 140, each variation **3*a*-3*d* is processed into a first output 5*a*-5*d* in a first processing branch 4, which comprises at least one first instance of the region 11** to be pre-trained.

In step 150, each variation **3*a*-3*d* is processed into a second output 7*a*-7*d* in a second processing branch 6, which comprises at least one second instance 11' of the region 11** to be pre-trained.

In step 160, for each variation **3*a*-3*d*, the similarity 9 of the first output 5*a*-5*d* generated from this variation 3*a*-3*d* to an aggregation 8 of the second outputs 7*a*-7*d* generated from all the other variations 3*a*-3*d* of the same training example 2*** is ascertained.

According to block 161, the aggregation 8 can comprise ascertaining a mean value, a medoid, or an element-wise maximum.

According to block 162, the similarity 9 can be ascertained by means of a distance measure. According to block **162*a***, a cosine distance can be selected as a distance measure.

In step 170, parameters **11*a* that characterize the behavior of the first instance of the region 11 to be pre-trained are optimized with the goal of maximizing the similarity 9. The fully optimized state of the parameters 11***a* is denoted by reference sign 11*a**.

In step 180, the parameters 11*a are specified as pre-trained parameters 1***a* # of the machine learning model 1.

In step 190, further training examples 2 are provided for inputs 2 of the machine learning model 1. These further training examples are labeled with target outputs 10*** with respect to a given task.

According to block 191, the further training examples 2 may belong to a different distribution or domain than the training examples 2*** used for the pre-training.

In step 200, the further training examples 2 are processed into outputs 10 by the machine learning model 1**.

In step 210, a deviation of these outputs 10 from the target outputs 10* is assessed by means of a given cost function 20.

In step 220, parameters 1*a* that characterize the behavior of the machine learning model 1 are optimized with the goal that the assessment 20*a* by the cost function 20 is expected to improve during the further processing of labeled training examples 2**.

The fully trained state of the parameters 1*a* is denoted by reference sign 1*a. The complete training also specifies the fully trained machine learning model 1*** as a whole.

According to block 221, the pre-trained parameters 1*a* # can be retained during the training with the further training examples 2**.

Figure 2:
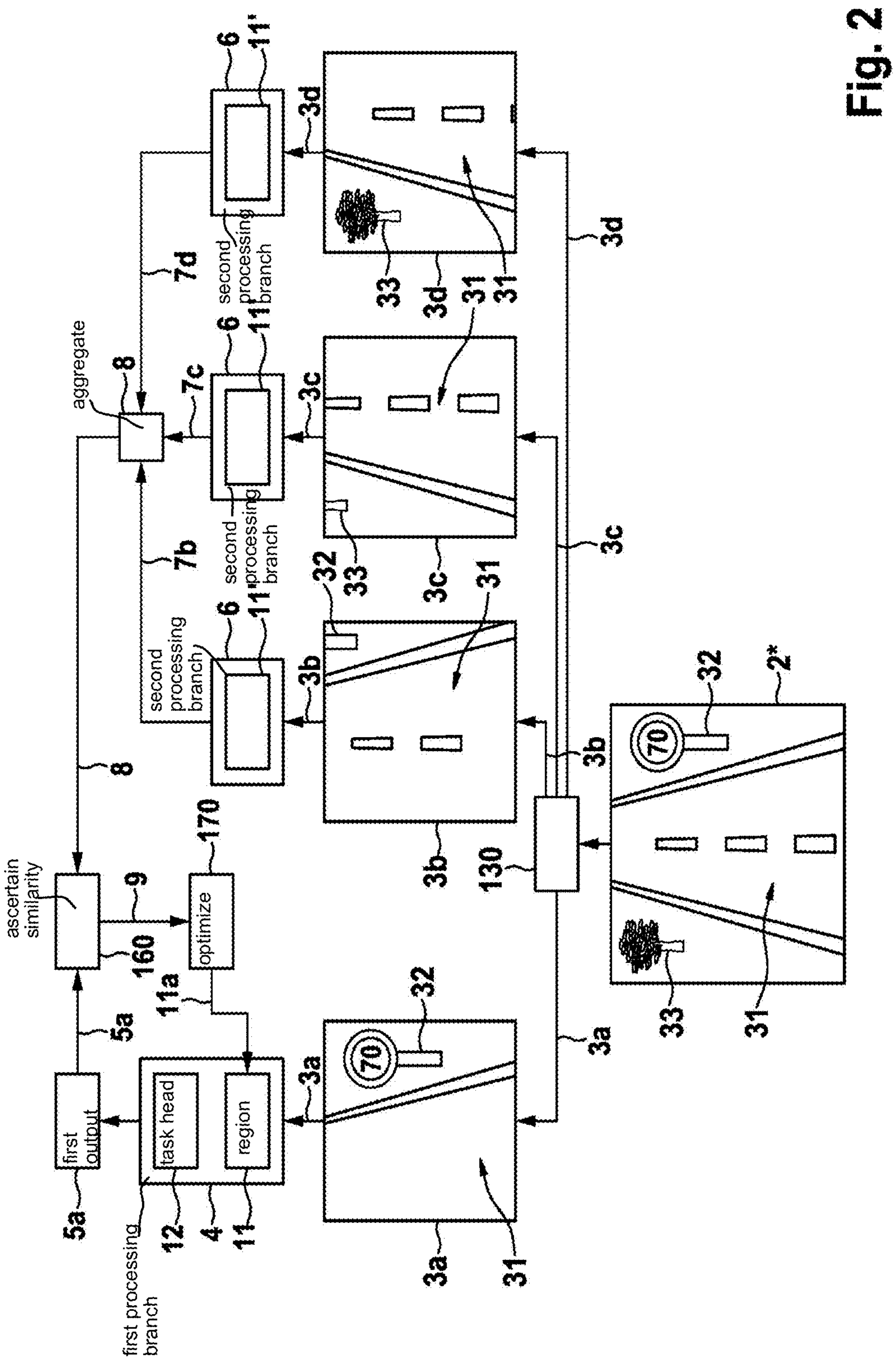
FIG. 2 shows an exemplary application of the method 100 on the basis of a training example 2* of a traffic situation, according to the present invention.

FIG. 2 shows, by way of example, the application of the method 100 on the basis of a training example 2*, which is an image of a traffic situation. The traffic situation contains a road 31 as well as a tree 33 at the left-hand edge of the road 31 and a traffic sign 32 at the right-hand edge of the road.

In step 130 of the method 100, variations 3*a*-3*d* are generated by respectively selecting sections from the training example 2*. The variation 3*a* shows a part of the right-hand edge of the road 31 and the traffic sign 32. The variation 3*b* shows another part of the right-hand edge of the road 31 and a part of the traffic sign 32. The variation 3*c* shows a part of the left-hand edge of the road 31 and a part of the tree 33. The variation 3*d* shows another part of the left-hand edge of the road 31 and the tree 33.

In the example shown in FIG. 2, the variation 3*a* is processed into the output 5*a* in the first processing branch 4. The first processing branch 4 contains the region 11 of the machine learning model 1 to be pre-trained as well as the task head 12 of the machine learning model 1. The variations 3*b*-3*d* are processed into outputs 7*b*-7*d* in a second processing branch 6. The second processing branch 6 contains another instance 11' of the region 11 of the machine learning model 1 that is to be pre-trained.

The outputs 7*b*-7*d* are combined in an aggregation 8. The output 5*a* from the first processing branch 4 is compared with this aggregation 8 in step 160. On the basis of the ascertained similarity 9, the parameters 11*a* of the region 11 to be pre-trained are optimized.

The invention claimed is:

1. A method for unsupervised pre-training of a machine learning model, comprising the following steps:
- providing a set of training examples for inputs of the machine learning model;
- specifying a region of the machine learning model that is to be pre-trained;
- generating variations from each of the training examples;
- processing each of the variations into a first output in a first processing branch, the first processing branch including at least one first instance of the region to be pre-trained;
- processing each of the variations into a second output in a second processing branch, the second processing branch including at least one second instance of the region to be pre-trained;
- for each of the variations, ascertaining a similarity of the first output generated from the variation to an aggregation of the second outputs generated from all of the other variations of the same training example;
- optimizing parameters that characterize a behavior of the first instance of the region to be pre-trained, with a goal of maximizing the ascertained similarity;
- specifying the optimized parameters as pre-trained parameters of the machine learning model.

2. The method according to claim 1, wherein the generating of the variations of each training example includes:
- selecting a proper subset of data of the training example randomly; and/or
- impressing noise sampled from a random distribution on the data of the training example; and/or
- removing or making unrecognizable in whole or in part a portion of the data of the training example; and/or
- applying, to the data of the training example, a transformation that does not change a semantic content of the data of the training example.

3. The method according to claim 1, wherein the region to be pre-trained is a region of the machine learning model that is configured to extract features from the input of the machine learning model.

4. The method according to claim 1, wherein the aggregation includes ascertaining a mean value, or a medoid, or an element-wise maximum.

5. The method according to claim 1, wherein the similarity is ascertained using a distance measure.

6. The method according to claim 5, wherein a cosine distance is the distance measure.

7. The method according to claim 1, wherein images or point clouds recorded by measurement observation of a scene are the training examples.

8. The method according to claim 7, wherein a traffic situation that can be observed from a vehicle the scene.

9. The method according to claim 7, wherein the machine learning model is configured to ascertain a classification of the images or point clouds.

10. The method according to claim 1, wherein:
- further training examples are provided for inputs of the machine learning model, wherein the further training examples are labeled with target outputs with respect to a given task;
- the further training examples are processed into outputs by the machine learning model);
- a deviation of the outputs from the target outputs is assessed using a given cost function; and
- parameters that characterize a behavior of the machine learning model are optimized with a goal that the assessment by the cost function is expected to improve during further processing of labeled training examples.

11. The method according to claim 10, wherein the pre-trained parameters are retained during a training with the further training examples.

12. The method according to claim 10, wherein the further training examples belong to a different distribution or different domain than the training examples used for the pre-training.

13. A non-transitory machine-readable data carrier on which is stored a computer program for unsupervised pre-training of a machine learning model, the computer program, when executed by more or more computers, causing the one or more computers to perform the following steps:

providing a set of training examples for inputs of the machine learning model;

specifying a region of the machine learning model that is to be pre-trained;

generating variations from each of the training examples;

processing each of the variations into a first output in a first processing branch, the first processing branch including at least one first instance of the region to be pre-trained;

processing each of the variations into a second output in a second processing branch, the second processing branch including at least one second instance of the region to be pre-trained;

for each of the variations, ascertaining a similarity of the first output generated from the variation to an aggregation of the second outputs generated from all of the other variations of the same training example;

optimizing parameters that characterize a behavior of the first instance of the region to be pre-trained, with a goal of maximizing the ascertained similarity;

specifying the optimized parameters as pre-trained parameters of the machine learning model.

14. One or more computers equipped by a non-transitory machine-readable data carrier on which is stored a computer program for unsupervised pre-training of a machine learning model, the computer program, when executed by the more or more computers, causing the one or more computers to perform the following steps:

providing a set of training examples for inputs of the machine learning model;

specifying a region of the machine learning model that is to be pre-trained;

generating variations from each of the training examples;

processing each of the variations into a first output in a first processing branch, the first processing branch including at least one first instance of the region to be pre-trained;

processing each of the variations into a second output in a second processing branch, the second processing branch including at least one second instance of the region to be pre-trained;

for each of the variations, ascertaining a similarity of the first output generated from the variation to an aggregation of the second outputs generated from all of the other variations of the same training example;

optimizing parameters that characterize a behavior of the first instance of the region to be pre-trained, with a goal of maximizing the ascertained similarity;

specifying the optimized parameters as pre-trained parameters of the machine learning model.

* * * * *